(12) United States Patent
Shan et al.

(10) Patent No.: US 12,325,063 B2
(45) Date of Patent: Jun. 10, 2025

(54) ULTRASONIC-ASSISTED PERMEATION AND HOMOGENIZATION MOLDING DEVICE AND METHOD FOR FROZEN PRINTING LIQUID DROPS

(71) Applicant: NANJING UNIVERSITY OF AERONAUTICS AND ASTRONAUTICS, Nanjing (CN)

(72) Inventors: Zhongde Shan, Nanjing (CN); Haoqin Yang, Nanjing (CN); Jianpei Shi, Nanjing (CN); Qinjiang Liu, Nanjing (CN); Yufeng Dai, Nanjing (CN); Wanneng Liao, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 18/031,012

(22) PCT Filed: Sep. 5, 2022

(86) PCT No.: PCT/CN2022/117061
§ 371 (c)(1),
(2) Date: Sep. 7, 2023

(87) PCT Pub. No.: WO2023/165106
PCT Pub. Date: Sep. 7, 2023

(65) Prior Publication Data
US 2024/0139799 A1    May 2, 2024

(30) Foreign Application Priority Data

Mar. 3, 2022  (CN) .......................... 202210210935.7

(51) Int. Cl.
*B29C 64/165*   (2017.01)
*B22C 9/02*     (2006.01)
(Continued)

(52) U.S. Cl.
CPC ................ *B22C 9/02* (2013.01); *B33Y 10/00* (2014.12); *B33Y 30/00* (2014.12); *B33Y 80/00* (2014.12)

(58) Field of Classification Search
CPC ........ B29C 64/165; B29C 64/30; B33Y 10/00
See application file for complete search history.

(56) References Cited

FOREIGN PATENT DOCUMENTS

| CN | 1093945 A | 10/1994 |
|----|-----------|---------|
| CN | 201483887 U | 5/2010 |

(Continued)

*Primary Examiner* — James Sanders
(74) *Attorney, Agent, or Firm* — Bayramoglu Law Offices LLC

(57) ABSTRACT

An ultrasonic-assisted permeation and homogenization molding device and method for frozen printing liquid drops are provided. The device includes an ultrasonic generator, a transducer and an amplitude-change pole. The ultrasonic generator generates 20 KHz low-frequency ultrasonic waves, and a flange plate is arranged on a pitch surface of the amplitude-change pole and connected with an outer cavity wall of the low-temperature molding chamber by threads. According to the ultrasonic-assisted permeation and homogenization molding method for frozen printing liquid drops, pre-paved molding sand particles are homogenized and distributed under ultrasonic vibration by adjusting the frequency of the ultrasonic generator in a sand paving process. When a pure water binder is sprayed, liquid drops are sprayed to the surface of premixed molding sand, and then permeate to the bottom of pre-cooled molding sand under the assistance of low-frequency ultrasonic waves to freeze and solidify.

2 Claims, 1 Drawing Sheet

(51) Int. Cl.
*B33Y 10/00* (2015.01)
*B33Y 30/00* (2015.01)
*B33Y 80/00* (2015.01)

(56) References Cited

FOREIGN PATENT DOCUMENTS

| | | |
|---|---|---|
| CN | 102358993 A | 2/2012 |
| CN | 104985116 A | 10/2015 |
| CN | 105599106 A | 5/2016 |
| CN | 2016216280 A | 12/2016 |
| CN | 107470627 A | 12/2017 |
| CN | 110899705 A | 3/2020 |
| CN | 113547076 A | 10/2021 |
| CN | 114054673 A | 2/2022 |
| CN | 114558990 A | 5/2022 |
| CN | 114799182 A | 7/2022 |
| JP | H01304204 A | 12/1989 |
| JP | 2006305877 A | 11/2006 |
| JP | 2011206961 A | 10/2011 |

ULTRASONIC-ASSISTED PERMEATION AND HOMOGENIZATION MOLDING DEVICE AND METHOD FOR FROZEN PRINTING LIQUID DROPS

CROSS REFERENCE TO THE RELATED APPLICATIONS

This application is the national phase entry of International Application No. PCT/CN2022/117061, filed on Sep. 5, 2022, which is based upon and claims priority to Chinese Patent Application No. 202210210935.7, filed on Mar. 3, 2022, the entire contents of which are incorporated herein by reference.

TECHNICAL FIELD

The present invention belongs to the cross field of additive manufacturing and casting technologies, can realize high-precision and high-efficiency 3D printing manufacturing technology of frozen sand molds, and in particular relates to an ultrasonic-assisted permeation and homogenization molding method for frozen printing liquid drops.

BACKGROUND

Three-dimensional ink-jet printing (3DP) is one of the most important processes of 3D printing technology in sand casting. Because 3DP provides a strength for a sand mold (core) by means of spraying a binder with a nozzle, laser as a heat source is not required, the equipment cost is relatively low, and there is no shrinkage deformation when curing at room temperature. 3DP has the advantages of large molding size, capability of producing medium and large sand molds (cores) and complex internal structures, etc. 3D printing for a frozen sand mold employs pure water as a binder for sand casting, where premixed sand is frozen layer by layer into a solid in a low temperature environment to keep its shape. The frozen sand mold collapses naturally under the impact of a high-temperature melt. No strong irritating gas is generated during casting, and the binder is pure water, so the 3D printing is pollution-free and conforms to the concept of green casting.

In the process of spraying pure water dropwise and freezing and binding molding sand, the sand paving process and liquid drop spraying characteristics have an important impact on the molding quality of a casting. A traditional sand paving device has problems of poor flatness and uneven density in the sand paving process. The pure water binder is permeated in the sand layer under the capillarity of a porous medium, and the permeation pressure is generated by the spray amount. Because the volume of a single liquid drop is in a range of tens of picoliters, the permeability of the sprayed liquid drops in the premixed molding sand is poor, which affects the molding accuracy and the strength of a sand mold, and thus affects the casting quality of a casting.

SUMMARY

For the problem of poor molding accuracy of a frozen sand mold at present, the present invention provides an ultrasonic-assisted permeation and homogenization molding device and method for frozen printing liquid drops. The method mainly solves the problems of poor flatness and uneven density of low-temperature premixed sand in a sand paving process, difficult permeation of liquid drops between premixed sand layers, etc.

To achieve the above purpose, the present invention is implemented by the following technical solution:

The present invention provides an ultrasonic-assisted permeation and homogenization molding device for frozen printing liquid drops, including an array nozzle, a sand paving device, an ultrasonic generator, a transducer, an amplitude-change pole and a low-temperature molding chamber. The array nozzle is located on a two-dimensional motion system and used for spraying a pure water solution as required to solidify molding sand; the sand paving device is located above the molding chamber and used for paving the molding sand; and the ultrasonic generator is located outside the molding chamber and connected with a power supply, and the transducer is mounted on a side of a frozen sand mold printing device and connected with the low-temperature molding chamber by means of the amplitude-change pole. The method improves the compactness of premixed molding sand and the permeability of liquid drops by using the good permeation promotion effect of low-frequency ultrasonic waves, thereby improving the accuracy of a sand mold.

An ultrasonic-assisted permeation and homogenization molding method for frozen printing liquid drops is applicable to a high-precision and high-efficiency development and trial production process of a frozen 3D printing sand mold, and the specific implementation steps are as follows:

S1, selecting appropriate molding sand according to the characteristics of a casting, stirring printed sand mold materials with liquid nitrogen or dry ice, and cooling the premixed molding sand to a sub-zero temperature (−40° C. to 0° C.);

S2, turning on the ultrasonic generator, converting alternating current into an ultrasonic frequency electric oscillation signal, converting the signal into an ultrasonic frequency mechanical vibration by the transducer, amplifying the amplitude of the vibration by the amplitude-change pole connected with the low-temperature molding chamber, and transmitting the vibration to a worktable;

S3, paving a layer of frozen pre-mixed molding sand by the sand paving device in the low-temperature molding environment, and adjusting the frequency of the ultrasonic generator so that pre-paved molding sand particles are homogenized and distributed under ultrasonic vibration; and S4, driving the array nozzle by a control system to spray a pure water binder as required according to cross-section information of a current layer of a sand mold, where liquid drops are sprayed to the surface of the premixed molding sand and permeate to the bottom of the pre-cooled molding sand under the assistance of ultrasonic waves for solidification and molding; and repeating steps 3 and 4 to complete the printing of the sand mold by means of layer-by-layer stacking.

Further, the thickness of frozen molding sand paved once by the sand paving device is 0.4 to 0.5 mm, the volume of a single liquid drop sprayed by the array nozzle is 40 to 80 pL, and the liquid drops permeate to the bottom molding sand particles and freeze to solidify the sand mold. The molding sand is too thin, which is difficult to achieve mechanically and requires high machining accuracy. When the thickness of the molding sand is greater than this range, the printed mold is delaminated seriously, which affects the size and morphology of a casting.

Further, the ultrasonic generator generates 20 KHz low-frequency ultrasonic waves. The low-frequency ultrasonic waves have a good permeation promotion effect due to their mechanical action, heating effect, cavitation effect, etc., and can significantly improve the permeation rate of the liquid drops in the frozen molding sand.

Further, when the ultrasonic transducer and the amplitude-change pole are fixed, a cross section with zero amplitude of the amplitude-change pole is connected with the low-temperature molding chamber to reduce the loss of ultrasonic vibration energy.

Further, a flange plate is machined at a pitch surface of the amplitude-change pole and combined with an outer cavity wall of the low-temperature molding chamber by means of threaded connection.

Further, the amplitude-change pole may be stepped, conical, catenary or composite according to different vibration modes.

Beneficial effects of the present invention are as follows:
(1) An ultrasonic generator, a transducer and an amplitude-change pole are configured in this solution for ultrasonic-assisted penetration of liquid drops. Low-frequency ultrasonic waves make molding sand particles in a sound field vibrate fiercely, so that the diameters of pores are changed, the permeability of liquid drops in a molding sand medium is improved, and the shape and size accuracy of a frozen casting mold are further improved.
(2) The sand paving process is in an environment of negative pressure, low temperature and low-frequency ultrasonic vibration, which can prevent the deformation and adhesion of premixed molding sand, improve the compactness of the molding sand, and reduce the influence of external environmental pressure and temperature on the printing process.

LIST OF REFERENCE NUMERALS

Figure 1:
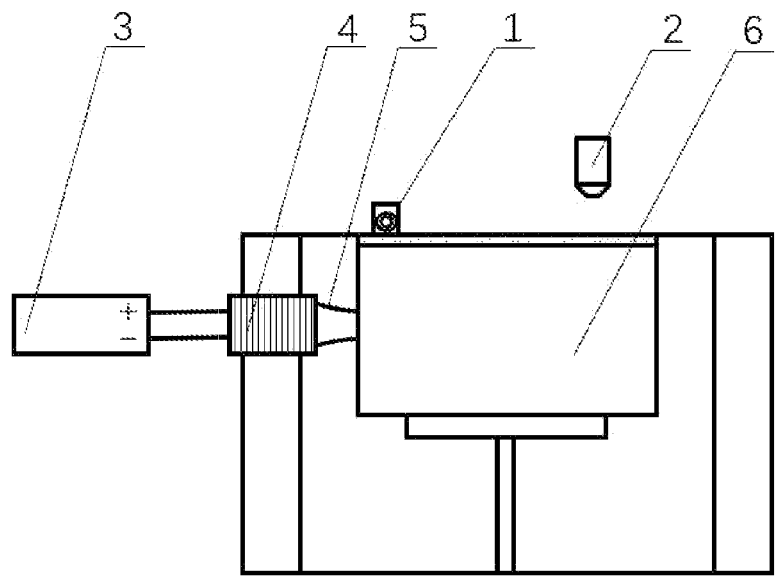
FIG. 1 is a structural schematic diagram of an ultrasonic-assisted permeation and homogenization molding device for frozen printing liquid drops according to the present invention.

1—sand paving device; 2—array nozzle; 3—ultrasonic generator; 4—transducer; 5—amplitude-change pole; 6—low-temperature molding chamber.

DETAILED DESCRIPTION OF THE EMBODIMENTS

The present invention will be further illustrated below in conjunction with the accompanying drawings and specific embodiments. It should be understood that the following specific embodiments are only used to illustrate the present invention, but not to limit the scope of the present invention. It should be noted that the terms "front", "back", "left", "right", "up" and "down" used in the following description refer to directions in the drawings, and the terms "inside" and "outside" refer to directions toward or away from the geometric center of a particular component, respectively.

Figure 2:
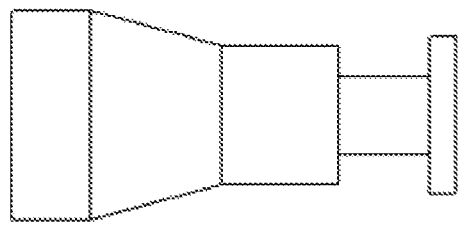
FIG. 2 is a structural schematic diagram of an amplitude-change pole according to the present invention.
Figure 3:
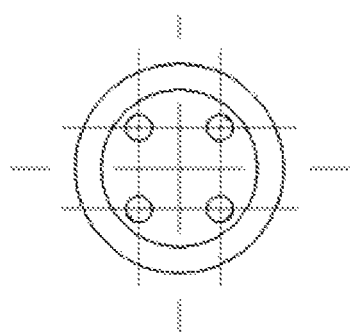
FIG. 3 is a right view of FIG. 2.

As shown in FIGS. 1-3, an ultrasonic-assisted permeation and homogenization molding device for frozen printing liquid drops includes an array nozzle 2, a sand paving device 1, an ultrasonic generator 3, a transducer 4, an amplitude-change pole 5 and a low-temperature molding chamber 6.

The array nozzle 2 is located on a two-dimensional motion system and used for spraying a pure water solution as required to solidify molding sand; the sand paving device 1 is located above the molding chamber and used for paving the molding sand; and the ultrasonic generator 3 is located outside the low-temperature molding chamber 6 and connected with a power supply, and the transducer 4 is mounted on a side of a frozen sand mold printing device and connected with the low-temperature molding chamber 6 by means of the amplitude-change pole 5.

An ultrasonic-assisted permeation and homogenization molding method for frozen printing liquid drops specifically includes the following steps:
S1, appropriate molding sand is selected according to the characteristics of a casting, printed sand mold materials are mixed with liquid nitrogen or dry ice, and the premixed molding sand is cooled to a sub-zero temperature (−40° C. to 0° C.);
S2, the ultrasonic generator is turned on, 20 KHz low-frequency ultrasonic waves are selected, alternating current is converted into an ultrasonic frequency electric oscillation signal, the signal is converted into an ultrasonic frequency mechanical vibration by the transducer, the amplitude of the vibration is amplified by the amplitude-change pole connected with the low-temperature molding chamber, and the vibration is transmitted to a worktable;
S3, a layer of frozen pre-mixed molding sand with a thickness of 0.4 to 0.5 mm is paved by the sand paving device in the low-temperature molding environment, and the frequency of the ultrasonic generator is adjusted so that pre-paved molding sand particles are homogenized and distributed under ultrasonic vibration; and
S4, a control system drives the array nozzle to spray a pure water binder as required according to cross-section information of a current layer of a sand mold, where liquid drops are sprayed to the surface of the premixed molding sand and permeate to the bottom of the pre-cooled molding sand under the assistance of ultrasonic waves for freezing, solidification and molding; and steps 3 and 4 are repeated to complete the printing of the sand mold by means of layer-by-layer stacking.

The low-frequency ultrasonic waves employed in this embodiment have a good permeation promotion effect due to their mechanical action, heating effect, cavitation effect, etc., and can significantly improve the permeation rate of the liquid drops in the frozen molding sand and the homogenization of the molding sand particles, thereby improving the molding accuracy of the printed sand mold. In addition, the contents not described in detail in this specification belong to the prior art known to those skilled in the art.

The technical means disclosed in the solution of the present invention are not limited to the technical means disclosed in the above-mentioned embodiments, but also include technical solutions formed by any combination of the above technical features.

What is claimed is:
1. An ultrasonic-assisted permeation and homogenization molding method for frozen printing liquid drops, using an ultrasonic-assisted permeation and homogenization molding device for frozen printing liquid drops, comprising an array nozzle, a sand paving device, an ultrasonic generator, a transducer, an amplitude-change pole and a low-temperature molding chamber, wherein the array nozzle is located on a two-dimensional motion system and configured for spraying a pure water solution as required to solidify a molding sand; the sand paving device is located above the low-temperature molding chamber and configured for paving the molding sand; the ultrasonic generator is located outside the low-temperature molding chamber and connected with a power supply, and the transducer is mounted on a side of a frozen sand mold printing device and connected with the low-temperature molding chamber by means of the amplitude-change pole, the molding method comprising the following steps:

step S1: selecting an appropriate molding sand according to characteristics of a casting, stirring printed sand mold materials with liquid nitrogen or dry ice, and cooling a premixed molding sand to a temperature of −40° C. to 0° C.;

step S2: turning on the ultrasonic generator, converting alternating current into an ultrasonic frequency electric oscillation signal, converting the ultrasonic frequency electric oscillation signal into an ultrasonic frequency mechanical vibration by the transducer, amplifying an amplitude of the ultrasonic frequency mechanical vibration by the amplitude-change pole connected with the low-temperature molding chamber, and transmitting the ultrasonic frequency mechanical vibration to a worktable;

step S3: paving a layer of frozen pre-mixed molding sand by the sand paving device in a low-temperature molding environment, and adjusting a frequency of the ultrasonic generator so that pre-paved molding sand particles are homogenized and distributed under ultrasonic vibration; and step S4: driving the array nozzle by a control system to spray a pure water binder as required according to cross-section information of a current layer of a sand mold, wherein liquid drops are sprayed to a surface of the premixed molding sand and permeate to a bottom of a pre-cooled molding sand under an assistance of ultrasonic waves for solidification and molding; and repeating steps S3 and S4 to complete a printing of the sand mold by means of layer-by-layer stacking;

wherein a thickness of a frozen molding sand paved once by the sand paving device is 0.4 mm to 0.5 mm, a volume of a single liquid drop sprayed by the array nozzle is 40 pL to 80 pL, and the liquid drops permeate to bottom molding sand particles and freeze to solidify the sand mold; the ultrasonic generator generates 20 KHz low-frequency ultrasonic waves, wherein the 20 KHz low-frequency ultrasonic waves have a permeation promotion effect due to mechanical action, heating effect, and cavitation effect of the 20 KHz low-frequency ultrasonic waves and the 20 KHz low-frequency ultrasonic waves are configured to improve a permeation rate of the liquid drops in a frozen molding sand; and when the ultrasonic transducer and the amplitude-change pole are fixed, a cross section with zero amplitude of the amplitude-change pole is connected with the low-temperature molding chamber to reduce a loss of ultrasonic vibration energy.

2. The ultrasonic-assisted permeation and homogenization molding method for frozen printing liquid drops according to claim 1, wherein the amplitude-change pole is stepped, conical, catenary or composite according to different vibration modes.

\* \* \* \* \*